United States Patent [19]

Schmidle

[11] 4,182,790

[45] Jan. 8, 1980

[54] LIQUID ALKYLACRYLAMIDES AND RELATED COMPOSITIONS

[75] Inventor: Claude J. Schmidle, Trenton, N.J.

[73] Assignee: Thiokol Corporation, Newtown, Pa.

[21] Appl. No.: 888,459

[22] Filed: Mar. 20, 1978

[51] Int. Cl.$^2$ ............................................... B05D 3/06
[52] U.S. Cl. ............................... 428/260; 260/561 N; 204/159.23; 427/54.1; 428/245; 428/290; 428/507; 526/303
[58] Field of Search .................... 427/54; 526/303; 260/561 N; 204/159.23; 428/245, 260, 290, 507

[56] References Cited

U.S. PATENT DOCUMENTS

| | | | |
|---|---|---|---|
| 3,151,157 | 9/1964 | Fugate et al. | 260/561 N |
| 3,161,679 | 12/1964 | D'Errico et al. | 260/561 N |
| 3,405,200 | 10/1968 | Yasumura et al. | 526/303 |
| 3,481,908 | 12/1969 | Mortimer | 526/303 |
| 3,796,578 | 3/1974 | Hosoi et al. | 96/35.1 |

FOREIGN PATENT DOCUMENTS 2049714 9/1977 Fed. Rep. of Germany .
2049715 9/1977 Fed. Rep. of Germany .

OTHER PUBLICATIONS

Jordan et al., "J. Poly. Sci." Part A-2, vol. 10, pp. 1657–1679 (1972) (P 1657 synopsis only required).

*Primary Examiner*—John H. Newsome
*Attorney, Agent, or Firm*—Stanley A. Marcus; Royal E. Bright

[57] ABSTRACT

Novel C6 to C18 liquid, branched-chain, N-α-alkylacrylamides, their use as reactive diluents and dye and pigment dispersants for radiation curable compositions, and radiation curable compositions containing them are disclosed.

8 Claims, No Drawings

LIQUID ALKYLACRYLAMIDES AND RELATED COMPOSITIONS

BACKGROUND OF THE INVENTION

This invention relates to compositions of matter classified in the art of chemistry as N-alkylacrylamides, to processes for their use and to radiation curable compositions containing them.

The use of a Ritter reaction between acrylonitrile and $C_{12}$, $C_{14}$, $C_{16}$ and $C_{18}$ α-olefins is disclosed by Clarke et al in Journal of the American Oil Chemists Society, Vol. 44, pp. 78 to 82 (1964). The products obtained are solid at room temperature.

U.S. Pat. No. 3,796,578 to Keizo Hosoi et al indicates the use of "N-hexylacrylamide" in radiation curable compositions for use on printing plates. The compositions are rather specialized in their requirements and it is nowhere suggested that other than linear 1-alkyl N-substituents of up to 6 carbon atoms would be suitable for use in said compositions. Copies of the publication and the patent accompany this application for the convenience of the Examiner.

SUMMARY OF THE INVENTION

The invention provides in a composition aspect, a compound of the Formula I:

(I)

Wherein R is hydrogen or methyl; and R' is an α-methyl substituted straight chain alkyl radical of from 5 to 10 carbon atoms, or a poly-branched alkyl radical of about 6 to about 18 carbon atoms.

The tangible embodiments of this composition aspect of the invention possess the inherent physical properties of being liquids at normal room temperature, of being substantially insoluble in water, and soluble in common organic solvents such as aromatic hydrocarbons, e.g. benzene or toluene; lower alkanols, e.g., ethanol, methanol; dimethyl acetamide; acetonitrile and the like and being of low vapor pressure under normal use conditions.

The tangible embodiments of this composition aspect of the invention possess the inherent applied use characteristics of being reactive diluents for radiation curable polymer systems, of being colorant dispersants indicating usefulness in the formulation of radiation curable pigmented or dye containing inks and coatings, and of being radiation curable coatings and impregnants for fabrics including woven and non-woven textiles and paper, such impregnation or coating improving surface finish and feel, oil and water repellency and wearing properties. The compositions are also of low toxicity to experimental animals in standard irritation screening.

Preferred embodiments of this composition aspect of the invention are those compounds of Formula I wherein R' is a poly-branched alkyl radical of from 9 to about 18 carbon atoms. Special mention is made of those embodiments wherein R' is derived from propylene trimer, tetramer, or the trimer dimerized. Special mention is also made of those compositions wherein the alkyl radical is a mixture of at least 2 radicals of different carbon atom content.

The invention further provides a curable composition which comprises an acrylate substituted prepolymer; and a compound of Formula I.

The invention further provides a curable composition which comprises a colorant and a compound of Formula I.

The invention further provides an ultraviolet curable composition which comprises an ultraviolet radiation cure accelerator and a compound of Formula I.

The invention further provides an article of manufacture which comprises a substrate comprising a woven or non-woven textile or a non-woven web of cellulosic fibers coated or impregnated with a curable composition comprising a compound of Formula I.

DESCRIPTION OF THE PREFERRED EMBODIMENT

The manner of making and using the compositions of the invention will now be illustrated with reference to a specific embodiment thereof and compositions containing same; namely, N-nonylacrylamide (Ia) prepared from propylene trimer (II).

II is a commercially available material prepared by the acid catalyzed random trimerization of propylene. To prepare Ia, II, acrylonitrile, and a free radical inhibitor, conveniently phenothiazine, may be warmed slightly above room temperature, conveniently at about 40° to 45° C. in concentrated sulfuric acid containing some water, conveniently about 85% acid, for a short period of time, conveniently about 4 to 24 hours. After cooling to room temperature, any unreacted II may be separated. Ia may, if desired, be recovered from the remaining reaction mixture by standard techniques, conveniently by pouring the reaction mixture into ice water, adding toluene, separating the 2 phases which form, washing the organic phase with water and sodium carbonate solution, drying and evaporating the organic phase in vacuo to give Ia as a liquid residue.

One skilled in the art will recognize that instead of the above described II and acrylonitrile, one may substitute either methacrylonitrile or other known α-olefins such as 1-hexene, 1-heptene, 1-octene, 1-nonene, 1-decene, 1-undecene, propylene tetramer, propylene trimer dimerized by treatment with a Lewis acid such as $BF_3$, 1,3,4,5,-tetramethyl-2-ethylheptene-1 and the like to prepare the other amides contemplated by Formula I. It will similarly be obvious to one skilled in the art that mixtures of olefins of the type contemplated as starting materials for the compounds of Formula I are also known and if subjected to a Ritter reaction under conditions analogous to those described herein above with either acrylonitrile or methacrylonitrile will produce compounds of Formula I wherein R' will be a mixture of alkyl residues. Such mixtures are contemplated by Formula I both in the specification and in the appended claims.

In the processes for the use of the compounds of Formula I their incorporation into standard radiation curable formulations as reactive diluents and/or as dye and pigment dispersants is contemplated.

For example, one may add Ia to an acrylated epoxidized vegetable oil, an ultraviolet light sensitizer, such as diethoxy acetophenone and any desired adjuvants, such as other reactive diluents, plasticizers, colorants, such as dyes or pigments and surfactants, coat the mixture onto a desired substrate and subject the coated substrate to ultraviolet light to produce a cured film on the substrate.

One skilled in the art will recognize that analogous compositions may be used for electron beam curing and that the presence of an ultraviolet light sensitizer will be unnecessary for such use.

For use as inks containing colorants, the standard colorants, either dyes or pigments, may be dispersed in compounds of Formula I together with any desired standard ink adjuvants such as adhesiveness or flow control agents, opaquing agents, and viscosity control agents and if the ink is to be cured by ultraviolet light, an ultraviolet cure accelerator.

Similarly for impregnating and coating fabrics and papers, compounds of Formula I, in addition to any standard adjuvants, may be applied to the material by standard methods followed by cure by electron beam or ultraviolet radiation.

Useful coatings and impregnants curable by ultraviolet radiation for use particularly in connection with non-woven cellulosic materials, such as paper and the like, may be obtained by the admixture of a compound of Formula I and an ultraviolet cure accelerator.

In the specification and the appended claims, the optional use of any and all standard adjuvants as mentioned herein above is comprehended by the invention.

As used herein and the appended claims the term α-methyl substituted straight chain alkyl of 5 to 10 carbon atoms comprehends an alkyl radical of the average formula

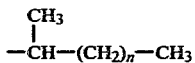

wherein n is 3 to 8; the term poly-branched alkyl radical of about 6 to 18 carbon atoms comprehends alkyl radicals of the specified number of carbon atoms having at least 2 chain branching points in the molecule.

One skilled in the art will recognize that the propylene trimers and tetramers, the dimerized propylene trimer and dimerized and trimerized mixtures of olefins of varying chain length comprehended among the starting materials for compounds of Formula I will be mixtures of all possible modes of addition of the monomers and that amides of such mixtures as well as of any single branched chain isomer thereof which may be separable either before or after formation of the N-alkyl amide are comprehended as part of this invention.

One skilled in the art will also recognize that for amides of poly-branched alkyl radicals of greater than about 12 carbon atoms, it will be necessary to have mixtures of alkyl chains, particularly mixtures of at least 2 varying chain length alkyl radicals to insure liquidity.

The acrylic acid residue substituted prepolymers comprehended among the starting materials for the compositions of this invention are those liquid acrylic acid or methacrylic acid substituted prepolymers known in the art. The linkage of the acrylate moiety to the prepolymer chain may be by reaction of the carboxylic acid portion of the acrylate molecule or its equivalent with hydroxyl, epoxy, urethane or amino functions on the prepolymer chain, or by reaction of a hydroxyl substituted acrylate ester with an epoxy, carboxy or urethane function on the prepolymer molecule.

Ultraviolet radiation cure accelerators are those standard radiation cure accelerators or mixtures thereof well known in the art. Commonly, these are benzoins, benzophenones, and acetophenones, either unsubstituted or more commonly substituted so as to increase efficiency at selected wavelengths. Use of such compounds in standard fashion in standard concentration ranges is contemplated.

Woven or non-woven textiles suitable for use in preparing the coated or impregnated articles of manufacture which are amenable to radiation curing, as well as for use in preparing the radiation cured articles of manufacture, are those known textiles prepared from the common fibers of commerce both natural and synthetic. Included among these fibers are; for example, cotton, linen, rayon, wool, polyester fibers, polyether fibers, polyamide fibers, polyurethane fibers, carbon fibers, and the like.

Non-woven cellulosic fiber webs include the common papers and like products of commerce; such as, rag papers, ground wood pulp papers, kraft papers and the like.

The following examples further illustrate the best mode contemplated by the inventor for the practice of his invention.

EXAMPLE 1

N-Nonylacrylamide

To a mixture of propylene trimer (504 parts by weight (pbw)) acrylonitrile (232 pbw), and phenothiazine (0.4 pbw) is added 85% sulfuric acid (510 pbw) at 40°–45° C. over a period of one hour. The reaction is held at this temperature for an additional four hours, cooled and the upper layer (unreacted olefin, 95 pbw) separated. The lower aqueous layer is decanted into ice water (1500 pbw) and toluene (250 pbw) added. The upper organic layer is washed twice with 100 pbw portions of water, then with 20% sodium carbonate solution (35 pbw) dried over anhydrous sodium sulfate (40 pbw) and evaporated under vacuum to give the title product as a liquid residue (575 pbw).

Analysis for: $C_{12}H_{23}NO$:
Calculated: C,73.04; H,11.75; N,7.10%.
Found: C,73.27; H,11.64; N,7.10%.

EXAMPLE 2

N-Dodecylacrylamide

To acrylonitrile (212 pbw), propylene tetramer (673 pbw) and phenothiazine (0.4 pbw) is added 85% sulfuric acid (520 pbw) at 40° C. over a period of one hour. The mixture is held at 40° to 42° C. for 12 hours. After cooling the upper layer of unreacted olefin is separated and the lower layer poured into ice water (1600 pbw). This mixture is stirred overnight then partitioned with 2 portions (500 pbw) of toluene. The combined organic phase is worked with 3 portions of water totalling 300 pbw and then to neutrality with 20% sodium carbonate. After drying over sodium sulfate and the addition of p-methoxyphenol, the solution is concentrated in vacuo to obtain the title product as a viscous yellow liquid (572 pbw).

EXAMPLE 3

N-(α-methylpentyl)acrylamide

Following a procedure analogous to that of Examples 1 and 2 from 530 pbw of acrylonitrile, 841.6 pbw hexene-1, 1.0 pbw phenothiazine and 1300 pbw 83% sulfuric acid, there is obtained 1010 pbw of the title product.

EXAMPLE 4

Toxicity screening of N-Nonylacrylamide

N-nonyl-acrylamide was tested according to the protocol established for the Federal Hazardous Substances Act.

The material is fed to fasted male and female albino rats in a geometric progression series of doses ranging from 2.0 to 64.0 mg/Kg of body weight. Animals are observed for deaths over a period of 2 weeks. The oral $LD_{50}$ found was 7430 mg/Kg of body weight.

The material is applied to hair free partially abraded skin of albino rabbits and held in place by a polyethylene sleeve over the test area for 24 hours, the skin cleaned and examined, following which the animals are observed for 2 weeks. Among six male and female albino rabbits, there were no deaths indicating a lack of acute dermal toxicity.

The test substance was tested for acute inhalation toxicity by exposing 10 adult male and female albino rats to an aerosol of the substance in an inhalation chamber for one hour. The animals were observed for a 2 week period following exposure and then sacrificed. All animals survived the observation period and no gross abnormalities were observed on autopsy after sacrifice.

The test substance was examined for eye irritation potential by introducing the test substance into the conjunctival sacs of the unwashed eyes of 6 albino rabbits. Evaluations of the results were made at 24, 48 and 72 hours according to the standardized scoring scheme established for the test. In this test score results below 5.0 indicate negligible potential for eye irritation. The test substance scored 4.3.

EXAMPLE 5

Ultraviolet light curable formulations are prepared containing the ingredients shown in Table I. The viscosity of each finished formulation is as shown. Films are cast on release paper from each formulation. In this and the following examples, prepolymer A is a hydroxyl terminated ethylene propylene 80/20 adipate polyester of about 2800 molecular weight capped with toluene diisocyanate then end-capped with 2-hydroxyethyl acrylate. Prepolymer B is a hydroxyl terminated poly(ethylene adipate), of about 600 molecular weight capped with toluene diisocyanate then endcapped with 2-hydroxyethyl acrylate. Prepolymer C is a hydroxy terminated poly(ethylene adipate) of molecular weight about 600 capped with hydrogenated methylene dianiline then endcapped with 2-hydroxyethyl acrylate. Prepolymer D is a hydroxyl terminated poly(ethylene adipate) of molecular weight about 600 capped with isophorone diisocyanate then endcapped with 2-hydroxyethyl acrylate, Actomer X-80 is an acrylic acid adduct to epoxidized vegetable oil supplied by Union Carbide Corp., Melcril 5919 is the reaction product of hydroxyalkyl acrylate with melamine formaldehyde resin supplied by Daubert Chemical Co., Epocryl 370 is an adduct of bisphenol A diglycidyl ether and acrylic acid supplied by Shell Chemical Co.

TABLE I

| Ingredient (pbw) | Formulation No. | | | | | |
|---|---|---|---|---|---|---|
| | 1 | 2 | 3 | 4 | 5 | 6 |
| Prepolymer C | 60 | 60 | | | | |
| Prepolymer D | | | 70 | | | |
| Actomer X-80 | | | | 70 | | |
| Melcril 5919 | | | | | 70 | |
| Epocryl 370 | | | | | | 70 |
| N-(α-methylpentyl)acrylamide (Ex 3) | 25 | 20 | 30 | 30 | 15 | 30 |
| Ethoxyethoxyethyl acrylate | 15 | 20 | | | 15 | |
| V-Pyrol | | | 14.4 | | | |
| Dioctylphthalate | | | | | | 20 |
| Diethoxyacetophenone | 2 | 2 | 2 | 2 | 2 | |
| Benzophenone | | | | | | 2.5 |
| Dimethylaminoethanol | | | | | | 2.5 |
| Viscosity (centistokes) | 5500 | 2500 | >14,800 | >14,800 | 12,000 | 240 | 810 |

TABLE II

After complete cure under ultraviolet light, properties of cast films are as shown in Table II.

| | Formulation No. | | | | | |
|---|---|---|---|---|---|---|
| | 1 | 2 | 3 | 4 | 5 | 6 |
| Tensile (psi) | 1800 | 1470 | 2925 | 2540 | Shattered on die cut | 3650 |
| Elongation (%) | 35 | 55 | 5 | <5 | | <5 |
| Modulus (psi) | | | | | | |
| 25% | 1620 | 795 | — | — | | — |
| 50% | — | 1310 | — | — | | — |
| 100% | — | — | — | — | | — |
| Yield (psi) | — | — | 2900 | — | | — |
| Tear (pli) | 129 | 72 | 244 | — | | — |

TABLE III

Ultraviolet curable compositions are prepared, their viscosities determined, cured films prepared and the properties of said films determined as shown in Table III.

| Ingredient (pbw) | Formulation No. | | | | | |
|---|---|---|---|---|---|---|
| | 1 | 2 | 3 | 4 | 5 | 6 |
| Prepolymer C | 60 | 60 | 60 | | 60 | |
| Prepolymer A | | | | 70 | | 70 |
| N-(α-methylheptyl) acrylamide (Ex 16) | 30 | 25 | 20 | 16.8 | | |
| N-nonylacrylamide (Ex 1) | | | | | 25 | 17.2 |
| Ethoxyethoxyethyl acrylate | 10 | 15 | 20 | | 15 | |
| V-Pyrol | | | | 13.2 | | 12.8 |
| Diethoxyacetophenone | 2 | 2 | 2 | 2 | 2 | 2 |
| Viscosity (centistokes) | >14,800 | >14,800 | 3,200 | >14,800 | 8,100 | >14,800 |
| Physical Properties | | | | | | |
| Tensile (psi) | 1820 | 1430 | 865 | 255 | 2140 | 1790 |
| Elongation (%) | 40 | 25 | 35 | 120 | 55 | 185 |

TABLE III-continued

Ultraviolet curable compositions are prepared, their viscosities determined, cured films prepared and the properties of said films determined as shown in Table III.

| Ingredient (pbw) | Formulation No. | | | | | |
|---|---|---|---|---|---|---|
| | 1 | 2 | 3 | 4 | 5 | 6 |
| Modulus (psi) | | | | | | |
| 25% | 1480 | (1300) | 595 | 90 | 1510 | 240 |
| 50% | | | | | (2280) | |
| 100% | | | | 190 | | 510 |
| Tear (pli) | 124 | 85 | 67 | 43 | 113 | 138 |

TABLE IV

Ultraviolet curable compositions are prepared, their viscosities determined, films cast and cured and the properties of said films determined as shown in Table IV.

| Ingredient (pbw) | Formulation No. | | | | |
|---|---|---|---|---|---|
| | 1 | 2 | 3 | 4 | 5 |
| Prepolymer C | 70 | 60 | 60 | 60 | |
| Prepolymer A | | | | | 70 |
| N-(α-methylnonyl) acrylamide (Ex 17) | 15 | 30 | 25 | 20 | 17.6 |
| Ethoxyethoxyethyl acrylate | 15 | 10 | 15 | 20 | |
| V-Pyrol | | | | | 12.4 |
| Diethoxyacetophenone | 2 | 2 | 2 | 2 | 2 |
| DC-11 (Dow Corning Silicone Surfactant) | 1 | 1 | 1 | 1 | |
| UCC L-7602 (Union Carbide Corp. Silicone Surfactant) | | | | | 1 |
| Viscosity (centistokes) | >14,800 | >14,800 | >14,800 | 5500 | >14,800 |
| Physical Properties | | | | | |
| Tensile (psi) | 1240 | 900 | 940 | 1165 | 85 |
| Elongation (%) | 35 | 30 | 35 | 65 | 120 |
| Modulus (psi) | | | | | |
| 25% | 995 | 765 | 725 | 330 | |
| 100% | | | | | 60 |
| Tear | 80 | 99 | 69 | 42 | 12 |

TABLE V

Ultraviolet curable compositins are prepared, their viscosities determined, cured films prepared and the properties of said films determined as shown in Table V.

| Ingredient (pbw) | Formulation No. | | | | | | |
|---|---|---|---|---|---|---|---|
| | 1 | 2 | 3 | 4 | 5 | 6 | 7 |
| Prepolymer C | 70 | 60 | 60 | 60 | | | |
| Prepolymer A | | | | | 70 | | |
| Prepolymer B | | | | | | 70 | 60 |
| N-Dodecylacrylamide (Ex 2) | 15 | 30 | 25 | 20 | 18.4 | 15 | 20 |
| Ethoxyethoxyethyl acrylate | 15 | 10 | 15 | 20 | | 15 | 20 |
| V-Pyrol | | | | | 11.6 | | |
| Diethoxyacetophenone | 2 | 2 | 2 | 2 | 2 | 2 | 2 |
| DC-11 | 1 | 1 | 1 | 1 | | 1 | 1 |
| UCC L-7602 | | | | | 1 | | |
| Viscosity (centistokes) | >14,800 | 22 14,800 | >14,800 | >14,800 | >14,800 | >14,800 | 8,100 |
| Properties | | | | | | | |
| Tensile (psi) | 1680 | 1680 | 1570 | 1110 | 480 | 1510 | 445 |
| Elongation (%) | 35 | 20 | 30 | 35 | 130 | 45 | 30 |
| Modulus (psi) | | | | | | | |
| 25% | 1440 | | 1400 | 810 | 110 | 795 | 310 |
| 100% | | | | | 285 | | |
| Tear (pli) | 102 | 123 | 105 | 68 | 120 | 69 | 32 |

TABLE VI

Ultraviolet curable compositions are prepared, their viscosities determined, cured prepared and the properties of said films determined as shown in Table VI.

| Ingredient (pbw) | Formulation No. | | | | | | | |
|---|---|---|---|---|---|---|---|---|
| | 1 | 2 | 3 | 4 | 5 | 6 | 7 | 8 |
| Prepolymer C | 60 | 60 | 60 | 60 | 60 | 60 | 60 | 60 |
| N-(αmethylheptyl acrylamide | 25 | 20 | | | | | | |
| N-Nonylacrylamide (Ex 1) | | | 25 | 20 | | | | |
| N-(α-methylnonyl) (Ex 17) acrylamide | | | | | 25 | 20 | | |
| N-Dodecyclacrylamide (Ex 2) | | | | | | | 25 | 20 |
| Phenoxyethyl acrylate | 15 | 20 | 15 | 20 | 15 | 20 | 15 | 20 |
| Diethoxyacetophenone | 2 | 2 | 2 | 2 | 2 | 2 | 2 | 2 |
| DC-11 | 1 | 1 | 1 | 1 | 1 | 1 | 1 | 1 |

TABLE VI-continued

Ultraviolet curable compositions are prepared, their viscosities determined, cured prepared and the properties of said films determined as shown in Table VI.

| Ingredient (pbw) | 1 | 2 | 3 | 4 | 5 | 6 | 7 | 8 |
|---|---|---|---|---|---|---|---|---|
| Viscosity (centistokes) | >14,800 | 12,000 | >14,800 | 8,100 | >14,800 | >14,800 | >14,800 | >14,800 |
| Properties | | | | | | | | |
| Tensile (psi) | 1700 | > | 2160 | 2590 | 1130 | 1915 | 2030 | 1880 |
| Elongation (%) | 50 | 50 | 40 | 55 | 25 | 50 | 25 | 25 |
| Modulus (psi) | | | | | | | | |
| 25% | 1245 | 1410 | 1910 | 1810 | | 1210 | (1965) | 1830 |
| 50% | | 2000 | | 2330 | | 1820 | | |
| Tear (pli) | 133 | 135 | 174 | 161 | 72 | 97 | 160 | 160 |

TABLE VII

Ultraviolet curable compositions are prepared, their viscosities determined, cured prepared and the properties of said films determined as shown in Table VII.

| Ingredient (pbw) | 1 | 2 | 3 | 4 | 5 | 6 | 7 |
|---|---|---|---|---|---|---|---|
| Prepolymer C | 60 | 60 | 60 | 60 | | 70 | |
| Prepolymer B | | | | | 70 | | 60 |
| N-Nonylacrylamide (Ex 1) | 30 | 20 | | | 15 | 15 | 20 |
| N-Dodecylarylamide (Ex 2) | | | 30 | 20 | | | |
| Ethoxyethoxyethyl acrylate | 10 | 20 | 10 | 20 | 15 | 15 | 20 |
| Diethoxyacetophenone | 2 | 2 | 2 | 2 | 2 | 2 | 2 |
| DC-11 | 1 | 1 | 1 | 1 | 1 | 1 | 1 |
| Viscosity | >14,800 | 2500 | >14,800 | 4100 | 12,000 | 12,000 | 4100 |
| Properties | | | | | | | |
| Tensile (psi) | 2000 | 1400 | 1710 | 1460 | 2320 | 2180 | 1815 |
| Elongation (%) | 5 | 35 | 15 | 40 | 45 | 35 | 65 |
| Modulus (psi) | | | | | | | |
| 25% | | (1030) | | 965 | 1510 | 1705 | 1150 |
| Tear (pli) | | | | | 132 | 140 | 67 |

TABLE VIII

Ultraviolet curable compositions are prepared, their viscosities determined, cured films prepared and the properties of said films determined as shown in Table VIII.

| Ingredient (pbw) | 1 | 2 | 3 | 4 | 5 | 6 | 7 |
|---|---|---|---|---|---|---|---|
| Prepolymer C | 60 | | | | | | 60 |
| Prepolymer D | | | | 70 | 70 | | |
| Acetomer X-80 | | 70 | | | | | |
| Melcril 5919 | | | 70 | | | | |
| Epocryl 370 | | | | | | 70 | |
| N-Nonylacrylamide (Ex 1) | 20 | 30 | 15 | 30 | 30 | 30 | 30 |
| Ethoxyethoxyethyl acrylate | 20 | 15 | | | | | 10 |
| Dipropylene Glycol dibenzoate | | | | | 20 | | |
| Dioctylphthlate | | | | | | 20 | |
| Diethoxyacetophenone | 2 | 2 | 2 | 2 | 2 | | 2 |
| Benzophenone/Dimethylamino-ethanol (II) | | | | | | 5.0 | |
| DC-11 | 1 | 1 | 1 | 1 | 1 | | 1 |
| UCC L-7602 | | | | | | 1 | |
| Viscosity | 3200 | >14,800 | 215 | >14,800 | >14,800 | 12,000 | >14,800 |
| Properties | | | | | | | |
| Tensile (psi) | 1610 | (2430) | shattered on die cut | 2490 | 1080 | 2780 | 1930 |
| Elongation (%) | 55 | (<5) | | 15 | 50 | <5 | 15 |
| Modulus (psi) | | | | | | | |
| 25% | 730 | | | | 590 | | |
| 50% | 1240 | | | | 950 | | |
| Tear (pli) | 54 | | | | | | |

TABLE IX

Ultraviolet curable compositions are prepared, their viscosities determined, cured films prepared and the properties of said films determined as shown in Table IX.

| Ingredient (pbw) | 1 | 2 | 3 | 4 | 5 | 6 |
|---|---|---|---|---|---|---|
| Prepolymer B | | 70 | | | | |
| Prepolymer C | | | 70 | 60 | 60 | 60 |
| Prepolymer A | 70 | | | | | |
| N-(α-methylpentyl, α-methylhexyl) acrylamide (Ex 15) | 14.6 | 15 | 15 | 20 | | |
| N-(α-methylpentyl) acrylamide (Ex 3) | | | | | 30 | 25 |

TABLE IX-continued

Ultraviolet curable compositions are prepared, their viscosities determined, cured films prepared and the properties of said films determined as shown in Table IX.

| Ingredient (pbw) | 1 | 2 | 3 | 4 | 5 | 6 |
|---|---|---|---|---|---|---|
| Ethoxyethoxyethyl acrylate | | 15 | 15 | 20 | 10 | 15 |
| V-Pyrol | 15.4 | | | | | |
| Diethoxyacetophenone | 2 | 2 | 2 | 2 | 2 | 2 |
| DC-11 | | | 1 | 1 | 1 | 1 |
| DC-1180 (silicone surfactant Dow Corning) | 2 | | | | | |
| Viscosity (centistokes) | >14,800 | 8100 | 12,000 | 2000 | 8100 | 2500 |
| Properties | | | | | | |
| Tensile (psi) | 600 | 2370 | 2340 | 1240 | 2250 | 2250 |
| Elongation (%) | 140 | 50 | 35 | 50 | 45 | 55 |
| Modulus (psi) | | | | | | |
| 25% | 150 | 1260 | 1830 | 705 | 1760 | 1320 |
| 50% | | | | | | 1980 |
| 100% | 375 | | | | | |
| Tear (pli) | 83 | 117 | 129 | 59 | 189 | 120 |

TABLE X

Ultraviolet curable compositions are prepared, their viscosities determined, cured films prepared and the properties of said films determined as shown in Table X.

| Ingredient (pbw) | 1 | 2 | 3 | 4 | 5 | 6 |
|---|---|---|---|---|---|---|
| Prepolymer C | 60 | | 60 | 60 | 60 | |
| Prepolymer A | | 70 | | | | 70 |
| N-(α-methylpentyl) acrylamide (Ex 3) | 20 | 15.6 | | | | |
| N-(α-methylheptyl) acrylamide (Ex 16) | | | 30 | 25 | 20 | 16.8 |
| Ethoxyethoxyethyl acrylate | 20 | | 10 | 15 | 20 | |
| V-Pyrol | | 14.4 | | | | 13.2 |
| Diethoxyacetophenone | 2 | 2 | 2 | 2 | 2 | 2 |
| DC-11 | 1 | | 1 | 1 | 1 | |
| Viscosity (centistokes) | 1500 | >14,800 | >14,800 | 4100 | 1500 | >14,800 |
| Properties | | | | | | |
| Tensile (psi) | 1565 | 1120 | 1190 | 1120 | 760 | 935 |
| Elongation (%) | 55 | 165 | 40 | 55 | 50 | 160 |
| Modulus (psi) | | | | | | |
| 25% | 715 | 190 | 820 | 480 | 310 | 160 |
| 50% | 1240 | | | 930 | | |
| 100% | | 435 | | | | 350 |
| Tear (pli) | 66 | 98 | 65 | 44 | 30 | 130 |

EXAMPLE 14

Ultraviolet Curable Colorant Dispersion

A dispersion of "Microlith" Blue 4G-T (an insoluble, dispersable organic pigment Ciba-Geigy) (20 weight %) and N-nonylacrylamide (Ex 1) (80 wt %) is prepared by ball milling. This dispersion is blended with trimethylol propane triacrylate at a number of weight ratios and the resulting compositions are painted on aluminum foil with a brush and cured in a PPG QC processor with 2 lamps, focused, in air, at a line speed of 20 feet per minute. At pigment dispersion/trimethylol propane triacrylate weight ratios of 1:1 and 2:1 the cured surfaces were tack free and no pigment could be rubbed off when wiped with a ball of cotton.

EXAMPLE 15

N-(α-methylpentyl,α-methyl-hexyl)acrylamide

Following a procedure analogous to that of Example 1, treat acrylonitrile with a mixture of 1-hexene and 1-heptene in the presence of 83% sulfuric acid and phenothiazine to obtain the title product.

EXAMPLE 16

N-(α-methylheptyl)acrylamide

Following a procedure analogous to that of Example 1, treat acrylonitrile with 1-octene in the presence of phenothiazene and 83% sulfuric acid to obtain the title product.

EXAMPLE 17

N-(α-methylnonyl)acrylamide

Following a procedure analogous to that of Example 1, treat acrylonitrile with 1-decene in the presence of phenothiazine and 83% sulfuric acid to obtain the title product.

The subject matter which applicant regards as his invention is particularly pointed out and distinctly claimed as follows:

1. An ultraviolet radiation curable composition comprising a compound of the formula:

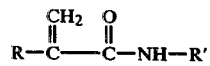

wherein R is hydrogen or methyl and R' is an α-methyl substituted straight chain alkyl radical of from 5 to 10 carbon atoms or a poly-branched alkyl radical of from about 6 to about 18 carbon atoms; and an ultraviolet radiation cure accelerator.

2. A composition as defined in claim 1 wherein R is hydrogen.

3. A composition as defined in claim 1 or 19 wherein R' is a poly-branched alkyl radical of about 9, 12, 15 or 18 carbon atoms.

4. A composition as defined in claim 3 wherein R' is a poly-branched alkyl radical of 9 carbon atoms.

5. A composition as defined in claim 3 wherein R' is a poly-branched alkyl radical of 12 carbon atoms.

6. A composition as defined in claims 1 or 19 wherein R' is an α-methylnonyl radical.

7. An article of manufacture which comprises a substrate comprising a woven or non-woven textile or a non-woven web of cellulosic fibers coated or impregnated with a curable composition comprising a compound of the formula:

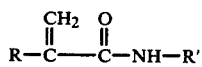

wherein R and R' are as defined in claim 1.

8. A process for the preparation of an article of manufacture comprising a substrate coated or impregnated on at least one surface thereof with a radiation cured coating or impregnant comprising the reaction products of a compound of the formula:

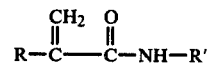

wherein R and R' are as defined in claim 1 which comprises:

a. coating or impregnating a substrate on at least one surface with a compound of the formula:

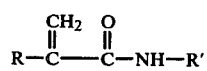

wherein R and R' are as defined herein; and b. treating the coated or impregnated substrate of step a above with electron beam or ultraviolet radiation.

* * * * *

UNITED STATES PATENT OFFICE
CERTIFICATE OF CORRECTION

Patent No. 4,182,790          Dated January 8, 1980

Inventor(s) Claude J. Schmidle

It is certified that error appears in the above-identified patent and that said Letters Patent are hereby corrected as shown below:

In the abstract, replace "N-α-alkylacrylamides" with --alkylacrylamides--.

In the claims, please amend the following:
Claim 3, line 1, replace "19" with --2--.

Claim 6, line 1, replace "19" with --2--.

In the Specification, please amend the following:

Column 4, line 58, replace "p-methoxyphenol" with --p-methoxyphenol--, and replace "in vacuo" with --*in vacuo*--.

UNITED STATES PATENT OFFICE
CERTIFICATE OF CORRECTION

Patent No. 4,182,790           Dated January 8, 1980

Inventor(s) Claude J. Schmidle

It is certified that error appears in the above-identified patent and that said Letters Patent are hereby corrected as shown below:

Columns 5 and 6, replace Table I with --

TABLE I

| Ingredient (pbw) | Formulation No. | | | | | |
|---|---|---|---|---|---|---|
| | 1 | 2 | 3 | 4 | 5 | 6 |
| Prepolymer C | 60 | 60 | | | | |
| Prepolymer D | | | 70 | | | |
| Actomer X-80 | | | | 70 | | |
| Melcril 5919 | | | | | 70 | |
| Epocryl 370 | | | | | | 70 |
| N-(α-methylpentyl) acrylamide (Ex 3) | 25 | 20 | 30 | 30 | 15 | 30 |
| Ethoxyethoxyethyl acrylate | 15 | 20 | | | 15 | |
| V-Pyrol | | | | | | |
| Dioctylphthalate | | | | | | 20 |
| Diethoxyacetophenone | 2 | 2 | 2 | 2 | 2 | |
| Benzophenone | | | | | | 2.5 |
| Dimethylaminoethanol | | | | | | 2.5 |
| Viscosity (centistokes) | 5500 | 2500 | >14,800 | 12,000 | 240 | 810 |

--.

UNITED STATES PATENT OFFICE
CERTIFICATE OF CORRECTION

Patent No. 4,182,790            Dated January 8, 1980

Inventor(s) Claude J. Schmidle

It is certified that error appears in the above-identified patent and that said Letters Patent are hereby corrected as shown below:
Column 6, replace Table II with --

After complete cure under ultraviolet light, the properties of cast films are as shown in Table II.

TABLE II

|  | Formulation No. | | | | | |
|---|---|---|---|---|---|---|
|  | 1 | 2 | 3 | 4 | 5 | 6 |
| Tensile (psi) | 1800 | 1470 | 2925 | 2540 | shattered on die cut | 3650 |
| Elongation (%) | 35 | 55 | 5 | <5 | | <5 |
| Modulus (psi) | | | | | | |
| 25% | 1620 | 795 | - | - | | - |
| 50% | - | 1310 | - | - | | - |
| 100% | - | - | - | - | | - |
| Yield (psi) | - | - | 2900 | - | | - |
| Tear (pli) | 129 | 72 | 244 | - | | - |

--.

UNITED STATES PATENT OFFICE
CERTIFICATE OF CORRECTION

Patent No. 4,182,790　　　　Dated January 8, 1980

Inventor(s) Claude J. Schmidle

It is certified that error appears in the above-identified patent and that said Letters Patent are hereby corrected as shown below:

Columns 5 and 6, and continuing onto Columns 7 and 8, replace Table III with --

EXAMPLE 6

Ultraviolet curable compositions are prepared, their viscosities determined, cured films prepared and the properties of said films determined as shown in Table III.

TABLE III

| Ingredient (pbw) | Formulation No. | | | | | |
|---|---|---|---|---|---|---|
| | 1 | 2 | 3 | 4 | 5 | 6 |
| Prepolymer C | 60 | 60 | 60 | | 60 | |
| Prepolymer A | | | | 70 | | 70 |
| N-(α-methylheptyl) acrylamide(Ex 16) | 30 | 25 | 20 | 16.8 | | |
| N-nonylacrylamide (Ex 1) | | | | | 25 | 17.2 |
| Ethoxyethoxyethyl acrylate | 10 | 15 | 20 | | 15 | |
| V-Pyrol | | | | 13.2 | | 12.8 |
| Diethoxyacetophenone | 2 | 2 | 2 | 2 | 2 | 2 |
| Viscosity (centistokes) | >14,800 | >14,800 | 3,200 | >14,800 | 8,100 | >14,800 |
| Physical Properties | | | | | | |
| Tensile (psi) | 1820 | 1430 | 865 | 255 | 2140 | 1790 |
| Elongation (%) | 40 | 25 | 35 | 120 | 55 | 185 |
| Modulus (psi) | | | | | | |
| 25% | 1480 | (1300) | 595 | 90 | 1510 | 240 |
| 50% | | | | | (2280) | |
| 100% | | | | 190 | | 510 |
| Tear (pli) | 124 | 85 | 67 | 43 | 113 | 138 |

--.

UNITED STATES PATENT OFFICE
CERTIFICATE OF CORRECTION

Patent No. 4,182,790   Dated January 8, 1980

Inventor(s) Claude J. Schmidle

It is certified that error appears in the above-identified patent and that said Letters Patent are hereby corrected as shown below:

Columns 7 and 8, replace Table IV with --

EXAMPLE 7

Ultraviolet curable compositions are prepared, their viscosities determined, films cast and cured and the properties of said films determined as shown in Table IV.

TABLE IV

| Ingredient (pbw) | Formulation No. | | | | |
|---|---|---|---|---|---|
| | 1 | 2 | 3 | 4 | 5 |
| Prepolymer C | 70 | 60 | 60 | 60 | |
| Prepolymer A | | | | | 70 |
| N-($\alpha$-methylnonyl) acrylamide (Ex 17) | 15 | 30 | 25 | 20 | 17.6 |
| Ethoxyethoxyethyl acrylate | 15 | 10 | 15 | 20 | |
| V-Pyrol | | | | | 12.4 |
| Diethoxyacetophenone | 2 | 2 | 2 | 2 | 2 |
| DC-11 (Dow Corning Silicone Surfactant) | 1 | 1 | 1 | 1 | |
| UCC L-7602 (Union Carbide Corp. Silicone Surfactant) | | | | | 1 |
| Viscosity (centistokes) | >14,800 | >14,800 | >14,800 | 5500 | >14,800 |
| Physical Properties | | | | | |
| Tensile (psi) | 1240 | 900 | 940 | 1165 | 85 |
| Elongation (%) | 35 | 30 | 35 | 65 | 120 |
| Modulus (psi) | | | | | |
| 25% | 995 | 765 | 725 | 330 | |
| 100% | | | | | 60 |
| Tear | 80 | 99 | 69 | 42 | 12 |

--.

UNITED STATES PATENT OFFICE
CERTIFICATE OF CORRECTION

Patent No. 4,182,790            Dated January 8, 1980

Inventor(s)  Claude J. Schmidle

It is certified that error appears in the above-identified patent and that said Letters Patent are hereby corrected as shown below:

Columns 7 and 8, replace Table V with --

EXAMPLE 8

Ultraviolet curable compositions are prepared, their viscosities determined, cured films prepared and the properties of said films determined as shown in Table V.

TABLE V

| Ingredient (pbw) | Formulation No. 1 | 2 | 3 | 4 | 5 | 6 | 7 |
|---|---|---|---|---|---|---|---|
| Prepolymer C | 70 | 60 | 60 | 60 | | | |
| Prepolymer A | | | | | 70 | | |
| Prepolymer B | | | | | | 70 | 60 |
| N-Dodecylacrylamide (Ex 2) | 15 | 30 | 25 | 20 | 18.4 | 15 | 20 |
| Ethoxyethoxyethyl acrylate | 15 | 10 | 15 | 20 | | 15 | 20 |
| V-Pyrol | | | | | 11.6 | | |
| Diethoxyacetophenone | 2 | 2 | 2 | 2 | 2 | 2 | 2 |
| DC-11 | 1 | 1 | 1 | 1 | | 1 | 1 |
| UCC L-7602 | | | | | 1 | | |
| Viscosity (centistokes) | >14,800 | >14,800 | >14,800 | >14,800 | >14,800 | >14,800 | 8,100 |
| Properties | | | | | | | |
| Tensile (psi) | 1680 | 1680 | 1570 | 1110 | 480 | 1510 | 445 |
| Elongation (%) | 35 | 20 | 30 | 35 | 130 | 45 | 30 |
| Modulus (psi) | | | | | | | |
| 25% | 1440 | | 1400 | 810 | 110 | 795 | 310 |
| 100% | | | | | 285 | | |
| Tear (pli) | 102 | 123 | 105 | 68 | 120 | 69 | 32 |

--.

UNITED STATES PATENT OFFICE
CERTIFICATE OF CORRECTION

Patent No. 4,182,790　　　　　　　　　Dated January 8, 1980

Inventor(s) Claude J. Schmidle

It is certified that error appears in the above-identified patent and that said Letters Patent are hereby corrected as shown below:

Columns 7 and 8, and continuing onto Columns 9 and 10, replace Table VI with --

EXAMPLE 9

Ultraviolet curable compositions are prepared, their viscosities determined, cured films prepared and the properties of said films determined as shown in Table VI.

TABLE VI

| Ingredient (pbw) | 1 | 2 | 3 | 4 | 5 | 6 | 7 | 8 |
|---|---|---|---|---|---|---|---|---|
| Prepolymer C | 60 | 60 | 60 | 60 | 60 | 60 | 60 | 60 |
| N-($\alpha$-methylheptyl) acrylamide | 25 | 20 | | | | | | |
| N-Nonylacrylamide (Ex 1) | | | 25 | 20 | | | | |
| N-($\alpha$-methylnonyl) (Ex 17) acrylamide | | | | | 25 | 20 | | |
| N-Dodecyclacrylamide (Ex 2) | | | | | | | 25 | 20 |
| Phenoxyethyl acrylate | 15 | 20 | 15 | 20 | 15 | 20 | 15 | 20 |
| Diethoxyacetophenone | 2 | 2 | 2 | 2 | 2 | 2 | 2 | 2 |
| DC-11 | 1 | 1 | 1 | 1 | 1 | 1 | 1 | 1 |
| Viscosity (centistokes) | >14,800 | 12,000 | >14,800 | 8,100 | >14,800 | >14,800 | >14,800 | >14,800 |
| Properties | | | | | | | | |
| Tensile (psi) | 1700 | 2280 | 2160 | 2590 | 1130 | 1915 | 2030 | 1880 |
| Elongation (%) | 50 | 50 | 40 | 55 | 25 | 50 | 25 | 25 |
| Modulus (psi) | | | | | | | | |
| 25% | 1245 | 1410 | 1910 | 1810 | | 1210 | (1965) | 1830 |
| 50% | | 2000 | | 2330 | | 1820 | | |
| Tear (pli) | 133 | 135 | 174 | 161 | 72 | 97 | 160 | 160 |

--.

UNITED STATES PATENT OFFICE
CERTIFICATE OF CORRECTION

Patent No. 4,182,790     Dated January 8, 1980

Inventor(s) Claude J. Schmidle

It is certified that error appears in the above-identified patent and that said Letters Patent are hereby corrected as shown below:

Columns 9 and 10, replace Table VII with --

EXAMPLE 10

Ultraviolet curable compositions are prepared, their viscosities determined, cured films prepared and the properties of said films determined as shown in Table VII.

TABLE VII

| Ingredient (pbw) | Formulation No. | | | | | | |
|---|---|---|---|---|---|---|---|
| | 1 | 2 | 3 | 4 | 5 | 6 | 7 |
| Prepolymer C | 60 | 60 | 60 | 60 | | 70 | |
| Prepolymer B | | | | | 70 | | 60 |
| N-Nonylacrylamide (Ex 1) | 30 | 20 | | | 15 | 15 | 20 |
| N-Dodecylarylamide (Ex 2) | | | 30 | 20 | | | |
| Ethoxyethoxyethyl acrylate | 10 | 20 | 10 | 20 | 15 | 15 | 20 |
| Diethoxyacetophenone | 2 | 2 | 2 | 2 | 2 | 2 | 2 |
| DC-11 | 1 | 1 | 1 | 1 | 1 | 1 | 1 |
| Viscosity | >14,800 | 2500 | >14,800 | 4100 | 12,000 | 12,000 | 4100 |
| Properties | | | | | | | |
| Tensile (psi) | 2000 | 1400 | 1710 | 1460 | 2320 | 2180 | 1815 |
| Elongation (%) | 5 | 35 | 15 | 40 | 45 | 35 | 65 |
| Modulus (psi) | | | | | | | |
| 25% | | (1030) | | 965 | 1510 | 1705 | 1150 |
| Tear (pli) | | | | | 132 | 140 | 67 |

--.

UNITED STATES PATENT OFFICE
CERTIFICATE OF CORRECTION

Patent No. 4,182,790                   Dated January 8, 1980

Inventor(s) Claude J. Schmidle

It is certified that error appears in the above-identified patent and that said Letters Patent are hereby corrected as shown below:

Columns 9 and 10, replace Table VIII with --

EXAMPLE 11

Ultraviolet curable compositions are prepared, their viscosities determined, cured films prepared and the properties of said films determined as shown in Table VIII.

TABLE VIII

| Ingredient (pbw) | 1 | 2 | 3 | 4 | 5 | 6 | 7 |
|---|---|---|---|---|---|---|---|
| Prepolymer C | 60 | | | | | | 60 |
| Prepolymer D | | | | 70 | 70 | | |
| Actomer X-80 | | 70 | | | | | |
| Melcril 5919 | | | 70 | | | | |
| Epocryl 370 | | | | | | 70 | |
| N-Nonylacrylamide (Ex 1) | 20 | 30 | 15 | 30 | 30 | 30 | 30 |
| Ethoxyethoxyethyl acrylate | 20 | 15 | | | | | 10 |
| Dipropylene Glycol dibenzoate | | | | | 20 | | |
| Dioctylphthlate | | | | | | 20 | |
| Diethoxyacetophenone | 2 | 2 | 2 | 2 | 2 | | 2 |
| Benzophenone/Dimethylamino-ethanol (II) | | | | | | 5.0 | |
| DC-11 | 1 | 1 | 1 | 1 | 1 | | 1 |
| UCC L-7602 | | | | | | 1 | |
| Viscosity | 3200 | >14,800 | 215 | >14,800 | >14,800 | 12,000 | >14,800 |
| Properties | | | | | | | |
| Tensile (psi) | 1610 | (2430) | shattered on die cut | 2490 | 1080 | 2780 | 1930 |
| Elongation (%) | 55 | (<5) | | 15 | 50 | <5 | 15 |
| Modulus (psi) | | | | | | | |
| 25% | 730 | | | | 590 | | |
| 50% | 1240 | | | | 950 | | |
| Tear (pli) | 54 | | | | | | |

--.

UNITED STATES PATENT OFFICE
CERTIFICATE OF CORRECTION

Patent No. 4,182,790         Dated January 8, 1980

Inventor(s)  Claude J. Schmidle

It is certified that error appears in the above-identified patent and that said Letters Patent are hereby corrected as shown below:

Columns 9 and 10, and continuing onto Columns 11 and 12, replace Table IX with --

EXAMPLE 12

Ultraviolet curable compositions are prepared, their viscosities determined, cured films prepared and the properties of said films determined as shown in Table IX.

TABLE IX

|  | Formulation No. | | | | | |
|---|---|---|---|---|---|---|
| Ingredient (pbw) | 1 | 2 | 3 | 4 | 5 | 6 |
| Prepolymer B |  | 70 |  |  |  |  |
| Prepolymer C |  |  | 70 | 60 | 60 | 60 |
| Prepolymer A | 70 |  |  |  |  |  |
| N-($\alpha$-methylpentyl, $\alpha$-methylhexyl) acrylamide (Ex 15) | 14.6 | 15 | 15 | 20 |  |  |
| N-($\alpha$-methylpentyl) acrylamide (Ex 3) |  |  |  |  | 30 | 25 |
| Ethoxyethoxyethyl acrylate |  | 15 | 15 | 20 | 10 | 15 |
| V-Pyrol | 15.4 |  |  |  |  |  |
| Diethoxyacetophenone | 2 | 2 | 2 | 2 | 2 | 2 |
| DC-11 |  | 1 | 1 | 1 | 1 | 1 |
| DC-1180 (silicone surfactant Dow Corning) | 2 |  |  |  |  |  |
| Viscosity (centistokes) | >14,800 | 8100 | 12,000 | 2000 | 8100 | 2500 |
| Properties | | | | | | |
| Tensile (psi) | 600 | 2370 | 2340 | 1240 | 2250 | 2250 |
| Elongation (%) | 140 | 50 | 35 | 50 | 45 | 55 |
| Modulus (psi) | | | | | | |
| 25% |  | 150 | 1260 | 1830 | 705 | 1760 | 1320 |
| 50% |  |  |  |  |  | 1980 |
| 100% | 375 |  |  |  |  |  |
| Tear (pli) |  | 83 | 117 | 129 | 59 | 189 | 120 |

--. Columns 11 and 12, replace Table X with --

EXAMPLE 13

Ultraviolet curable compositions are prepared, their viscosities determined, cured films prepared and the properties of said films determined as shown in Table X.

UNITED STATES PATENT AND TRADEMARK OFFICE
CERTIFICATE OF CORRECTION

PATENT NO. : 4,182,790

DATED : January 8, 1980

INVENTOR(S) : Claude J. Schmidle

It is certified that error appears in the above—identified patent and that said Letters Patent is hereby corrected as shown below:

TABLE X

| Ingredient (pbw) | Formulation No. | | | | | |
|---|---|---|---|---|---|---|
| | 1 | 2 | 3 | 4 | 5 | 6 |
| Prepolymer C | 60 | | 60 | 60 | 60 | |
| Prepolymer A | | 70 | | | | 70 |
| N-($\alpha$-methylpentyl) acrylamide (Ex 3) | 20 | 15.6 | | | | |
| N-($\alpha$-methylheptyl) acrylamide (Ex 16) | | | 30 | 25 | 20 | 16.8 |
| Ethoxyethoxyethyl acrylate | 20 | | 10 | 15 | 20 | |
| V-Pyrol | | 14.4 | | | | 13.2 |
| Diethoxyacetophenone | 2 | 2 | 2 | 2 | 2 | 2 |
| DC-11 | 1 | | 1 | 1 | 1 | |
| Viscosity (centistokes) | 1500 | >14,800 | >14,800 | 4100 | 1500 | >14,800 |
| Properties | | | | | | |
| Tensile (psi) | 1565 | 1120 | 1190 | 1120 | 760 | 935 |
| Elongation (%) | 55 | 165 | 40 | 55 | 50 | 160 |
| Modulus (psi) | | | | | | |
| 25% | 715 | 190 | 820 | 480 | 310 | 160 |
| 50% | 1240 | | | 930 | | |
| 100% | | 435 | | | | 350 |
| Tear (pli) | 66 | 98 | 65 | 44 | 30 | 130 |

Signed and Sealed this

Twenty-third Day of February 1982

[SEAL]

Attest:

Attesting Officer

GERALD J. MOSSINGHOFF

Commissioner of Patents and Trademarks